(12) United States Patent
Erlingsson

(10) Patent No.: US 7,698,713 B2
(45) Date of Patent: Apr. 13, 2010

(54) ALTERED STATES OF SOFTWARE COMPONENT BEHAVIOR

(75) Inventor: Ulfar Erlingsson, San Francisco, CA (US)

(73) Assignee: Google Inc., Mountain View, CA (US)

( * ) Notice: Subject to any disclaimer, the term of this patent is extended or adjusted under 35 U.S.C. 154(b) by 942 days.

(21) Appl. No.: 10/082,591

(22) Filed: Feb. 22, 2002

(65) Prior Publication Data

US 2003/0131152 A1 Jul. 10, 2003

Related U.S. Application Data

(60) Provisional application No. 60/323,886, filed on Sep. 20, 2001.

(51) Int. Cl.
G06F 3/00 (2006.01)
G06F 9/44 (2006.01)
G06F 9/46 (2006.01)
G06F 13/00 (2006.01)

(52) U.S. Cl. .................... 719/320; 719/313; 709/224

(58) Field of Classification Search ............. 719/310, 719/311–320, 328–330; 709/224
See application file for complete search history.

(56) References Cited

U.S. PATENT DOCUMENTS

| | | | |
|---|---|---|---|
| 5,263,147 A | 11/1993 | Francisco et al. | |
| 5,537,548 A | 7/1996 | Fin et al. | 395/200.04 |
| 5,761,477 A | 6/1998 | Wahbe et al. | |
| 5,764,985 A | 6/1998 | Smale | 395/682 |
| 5,828,893 A | 10/1998 | Wied et al. | |
| 5,832,263 A | 11/1998 | Hansen et al. | 395/681 |
| 5,845,129 A | 12/1998 | Wendorf et al. | |
| 5,913,024 A | 6/1999 | Green et al. | |
| 5,915,085 A | 6/1999 | Koved | |
| 5,918,018 A | 6/1999 | Gooderum et al. | |
| 5,956,507 A | 9/1999 | Shearer, Jr. et al. | 395/674 |
| 5,974,470 A | 10/1999 | Hammond | 709/305 |
| 6,023,721 A | 2/2000 | Cummings | |
| 6,167,520 A | 12/2000 | Touboul | |
| 6,463,583 B1* | 10/2002 | Hammond | 717/162 |
| 6,505,300 B2 | 1/2003 | Chan et al. | |
| 6,529,985 B1 | 3/2003 | Deianov et al. | 710/260 |
| 6,587,877 B1* | 7/2003 | Douglis et al. | 709/224 |
| 6,587,888 B1 | 7/2003 | Chieu et al. | 709/313 |
| 6,687,732 B1* | 2/2004 | Bector et al. | 709/200 |
| 7,213,249 B2* | 5/2007 | Tung Loo et al. | 719/330 |
| 2002/0091798 A1* | 7/2002 | Joshi et al. | 709/219 |
| 2002/0099952 A1 | 7/2002 | Lambert et al. | |
| 2005/0021796 A1* | 1/2005 | McClain et al. | 709/229 |

OTHER PUBLICATIONS

Anurag Acharya, et al., "MAPbox: Using Parameterized Behavior Classes to Confine Untrusted Applications", Proceedings of the 9th USENIX Security Symposium, Aug. 14-17, 2000, 17 pages.

(Continued)

Primary Examiner—Diem K Cao
(74) Attorney, Agent, or Firm—Sterne, Kessler, Goldstein & Fox PLLC

(57) ABSTRACT

An altered states engine executes in computer memory, controlling the execution of at least one software component based upon condition dependent rules. Responses to requests for system resources are modified, and code is executed such that the software components execute desired functionality, as specified by the rules.

109 Claims, 5 Drawing Sheets

OTHER PUBLICATIONS

Barry Boehm, "Managing Software Productivity and Reuse," University of Southern California, Sep. 1999, pp. 111-113.

P. Deutsch, et al., "A Flexible Measurement Tool for Software Systems," Information Processing (Proceedings of the IFIP Congress), 1972, pp. 320-326.

Guy Edjlali, et al., "History-based Access Control for Mobile Code," 5th Conference on Computer & Communications Security, 1998, pp. 38-48.

Úlfar Erlingsson, et al., "IRM Enforcement of Java Stack Inspection," IEEE, 2000, 10 pages.

Úlfar Erlingsson, et al., "SASI Enforcement of Security Policies: A Retrospective," Department of Computer Science, Cornell University, pp. 87-95.

David Evans, et al., "Flexible Policy-Directed Code Safety," MIT Laboratory for Computer Science, IEEE, 1999, 14 pages.

Timothy Fraser, et al., "Hardening COTS Software with Generic Software Wrappers," TIS Labs at Network Associates, Inc., IEEE, 1999, 15 pages.

Ian Goldberg, et al., "A Secure Environment for Untrusted Helper Applications (Confining the Wily Hacker)," Proceedings of the Sixth USENIX UNIX Security Symposium, Jul. 1996, 14 pages.

Robert P. Goldberg, "Survey of Virtual Machine Research," IEEE Computer, Jun. 1974, vol. 7, No. 6, pp. 34-45.

Manoj Lal, et al., "A Scheduling Scheme for Controlling Allocation of CPU Resources for Mobile Programs,"University of California, Davis, Aug. 31, 1999, pp. 1-33.

Jerome H. Salzter, et al., "The Protection of Information in Computer Systems", Proceedings of the IEEE 63, Sep. 1975, 30 pages.

Robert Wahbe, et al., "Efficient Software-Based Fault Isolation," Computer Science Division , University of California, SIGOPS, 1993, pp. 203-216.

* cited by examiner

ALTERED STATES OF SOFTWARE COMPONENT BEHAVIOR

CROSS-REFERENCE TO RELATED APPLICATIONS

This application claims priority under 35 U.S.C. § 119(e) from U.S. Provisional Patent Application Ser. No. 60/323,886, filed Sep. 20, 2001, the entirety of which is incorporated herein by reference.

BACKGROUND

1 Field of Invention

The present invention relates to flexibly altering computer software component behavior according to condition dependent rules.

1 Background of Invention

For various reasons, such as reduction in complexity and failure isolation, computer systems are usually created as stacked layers of services, where a service provides functionality to either other (client) services, or to client software components through an interface. Generally when a request is made to a service through its interface, the particular behavior of the service is determined by the specific function call and the invocation arguments passed to the service. When the service is complete, a result is generally returned to the requesting software component (potentially the result of the service behavior, or a status code).

One advantage of the "stacked services" structure of computer systems is that service implementation may change without any change in the service's clients, as long as the service interface is unchanged. This technique is described in Boehm, B. "Managing Software Productivity and Reuse," *IEEE Computer*, September 1999, 32(9): 111-113. One approach to changing service behavior is intercepting system service requests and redirecting or otherwise modifying the handling of the request. Interception is useful if changes need to be made in the implementation of an existing service.

Interception of system service requests has been applied for various purposes, since, at least, the Virtual Machine concept of the mid-1960s. Interception is discussed, for example, in Deutsch, P. and Grant, C. A., "A Flexible Measurement Tool for Software Systems," *Information Processing (Proceedings of the IFIP Congress)*, 1971, pp 320-326 ("Deutsch"), and in Goldberg, R. P., "Survey of Virtual Machine Research," *IEEE Computer*, June 1974, 7(6): 34-45 ("Goldberg"). In general, there are three categories in which interception is typically applied: Virtual Machines, Access Control and Functionality Enhancement.

A Virtual Machine is a hardware-supported use of "alternate data, same code" semantics. Interception can be used to determine, for the purposes of virtualization, on which set of data the system will operate. This technique is described in Goldberg, in U.S. Pat. No. 5,761,477, entitled "Methods for Safe and Efficient Implementations of Virtual Machines," and in U.S. Pat. No. 5,915,085, entitled "Multiple Resource or Security Contexts in a Multithreaded Application."

Access Control is a security mechanism that either gives original semantics or failure (access denied) semantics. The decision of whether to permit or deny access is rule based, and can depend on runtime variables or any previous behavior. Interception can be used to query an access-control mechanism upon a service request to determine whether or not the specified operation is actually to be performed. Access Control is discussed in U.S. Pat. No. 5,263,147 entitled "System for Providing High Security for Personal Computers and Workstations," in U.S. Pat. No. 5,845,129 entitled "Protection Domains in a Single Address Space," and in U.S. Pat. No. 5,918,018, entitled "System and Method for Achieving Network Separation."

Functionality Enhancement involves modifying a specific service to provide enhanced functionality, e.g., providing crash protection by intercepting memory violations and changing the response in a fixed way, changing disk operations to compress data, encrypting and decrypting network data, etc. Interception can be selectively used to change behavior of certain service operations. Specific examples of Functionality Enhancement are described in U.S. Pat. No. 5,828,893 entitled "System and Method of Communicating between Trusted and Untrusted Computers," and in U.S. Pat. No. 5,913,024 entitled "Secure Server Utilizing Separate Protocol Stacks."

Virtual Machines, Access Control and Functionality Enhancement are all useful, but each technique is limited. Virtual machines allow the same code to be executed utilizing different data, but do not allow the execution of different code. Furthermore, Virtual Machines are not dynamic. Although multiple computers are simulated by the use of alternative data sets, Virtual Machines cannot adjust the behavior of the code based upon historical or other conditions. Additionally, Virtual Machines cannot make rule based decisions in real-time as to which data set to use based upon current conditions.

Access Control allows a rule based access decision to be made in real-time, but does not allow any functionality beyond permitting or denying the access request. Access Control cannot allow the access on alternate data or simulate the access without actually permitting it. Furthermore, Access Control cannot implement alterative code on the target or alternative data, based upon the current conditions. Access Control merely allows called code to access targeted data, or prevents the called code from executing altogether.

Functionality Enhancement only enables alternative code to execute when specific service requests are made. This technique is useful, but like Virtual Machines, Functionality Enhancement is not dynamic. Alternative code accesses requested target data, but known Functionality Enhancement does not enable accessing alternative data, or making rule based decisions in real-time as to which code to execute, or as to what data or other resources to permit access.

Changing operation semantics (system service behavior) based on a set of rules is desirable, as it would be beneficial to flexibly allow one mechanism to be utilized for various purposes through simple rule changes. Access Control, while rule based, does not fully deliver this capability, as it either allows or disallows requested operations, but does not support the concept of otherwise changing their behavior, e.g., by doing something other than requested. Previous attempts at flexible behavior modification, (e.g. the work described in Badger, L. et al., "Hardening COTS software with Generic Software Wrappers," *Proceedings of 1999 IEEE Symposium on Security and Privacy*, May 1999, pp 2-16), only mediate a limited set of services (e.g. system calls) and constrain the mediation structure into a set of independent system call wrappers.

What is needed is a methodology that combines the rule-based characteristics of Access Control, where decisions on how to respond to service requests are made at run-time (potentially based on arbitrarily complex computation on the service arguments and previous execution history), with both the alternate data set manipulation of Virtual Machines and the alternate service implementation of Functionality Enhancement.

SUMMARY OF INVENTION

The present invention leverages the combination of the rule-based characteristic of Access Control, where decisions on how to respond to service requests are made at run-time, with both the alternate data sets of Virtual Machines and the alternate service implementation of Functionality Enhancement. This enables flexible alteration of software component behavior according to condition dependent rules. Generally, service requests made by a software components are intercepted. A desired behavior for the software component under the current conditions is determined, based upon rules. The software component is controlled, such that the software component executes the desired behavior and/or manipulates the desired data.

Interception may arbitrarily change operation semantics (irrespective of original semantics), including denying the service, performing it on alternate or fake data, or simply leaving it unchanged. Interception may be performed on all service requests in a system, not just on a single interface such as operating system calls.

The modification of service semantics is rule based. In one embodiment, a general-purpose engine interprets rules to determine desired semantics modifications. An operation in any service may be independently subject to rules that specify whether or how its semantics are changed. One embodiment of the present invention has built-in support for both static rules (e.g., fixed by product developers) and dynamic rules (e.g., dependent on runtime variables). Dynamic rules may depend on any previous behavior (runtime variables can be used to summarize execution history), including previous access authorization.

The behavior of the original software component can be modified as desired, in effect creating altered states of software component behavior. By flexibly modifying software component behavior, the present invention can function essentially as a factory from which various utilities can be derived with unprecedented speed and flexibility.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF PREFERRED EMBODIMENTS

I. System Overview

Figure 1:
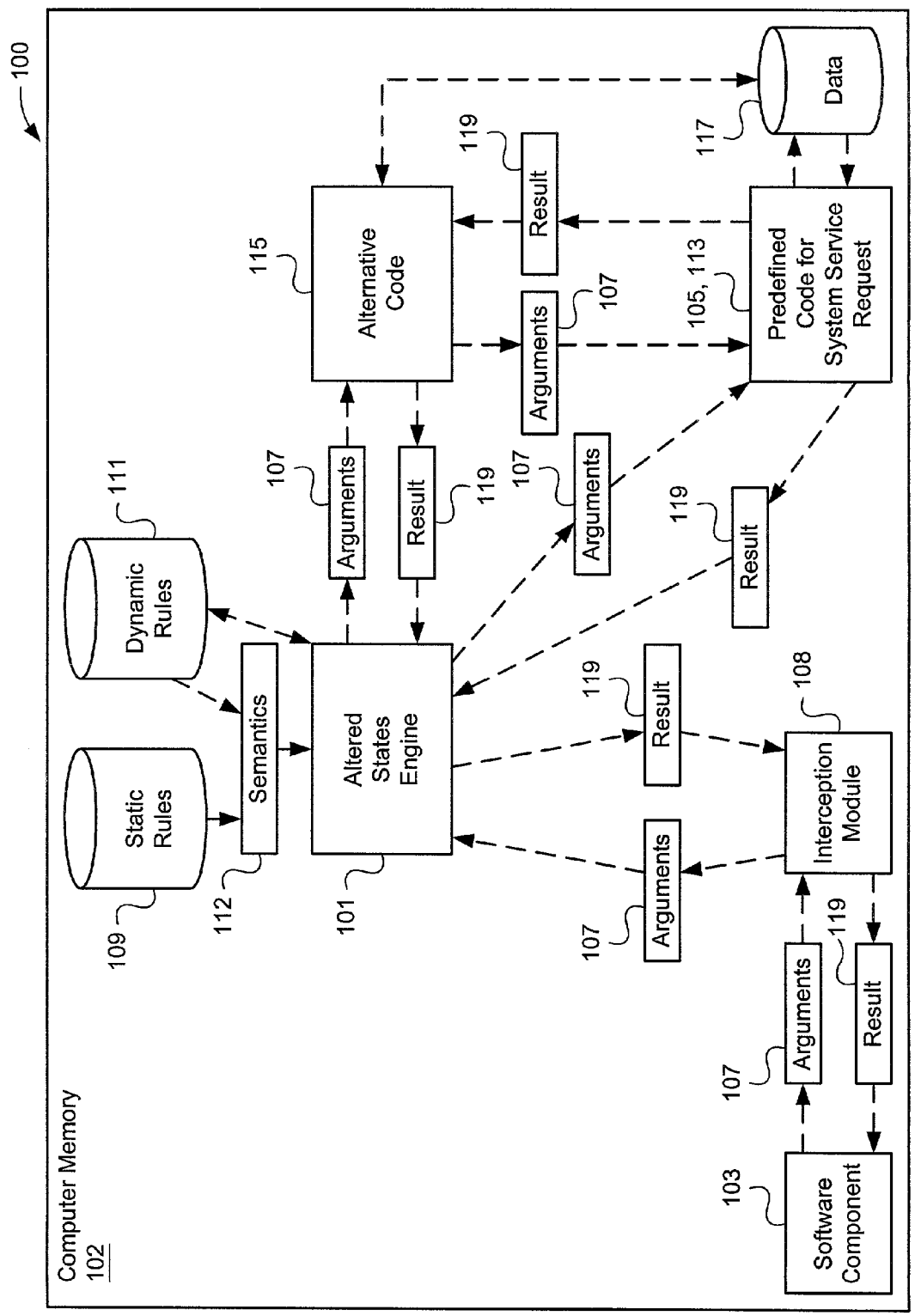
FIG. 1 is a block diagram illustrating a system for flexibly altering software component behavior according to condition dependent rules, according to one embodiment of the present invention.

FIG. 1 is illustrates an altered states system 100 for flexibly altering software component behavior according to condition dependent rules, according to one embodiment of the present invention. An altered states engine 101 executes in computer memory 102. The altered states engine 101 can either be a stand alone program (as illustrated), or a sub-component of a larger program, or a plurality of separate programs, as desired. A software component 103 also executes in computer memory. Although FIG. 1 illustrates only one software component 103, it is to be understood that within a given computer memory 102, more than one software component 103 can execute simultaneously.

A software component 103 calls system services 105 with appropriate arguments 107. An interception module 108 intercepts calls to the system services 105, and passes the arguments 107 to an altered states engine 101 which can consult static rules 109 and/or dynamic rules 111 to determine the desired behavior for the software component 103 under the current conditions, and consequently the desired semantics 112 for the system service 105. In order to execute the desired system service 105 semantics 112, the altered states engine 101 may invoke the predefined code 113 for the called system service 105 (with either modified, alternative or unchanged arguments 107, as desired), or may invoke alternative code 115 to perform similar or non-similar functionality (e.g. code with the same or an entirely different purpose). The alternative code 115 can but need not call predefined code 113. The code that executes (be it predefined code 113, alternative code 115 or a combination of the two) can access original system data 117, a copy thereof, or alternative data 117 as desired. Upon completion of execution, the code returns a result 119 to the altered states engine 101, which in turn returns the result 119 to is the interception module 108, which returns the result 119 to the calling software component 103. Each of these components is discussed in greater detail below.

II. The Interception Module

Figure 2:
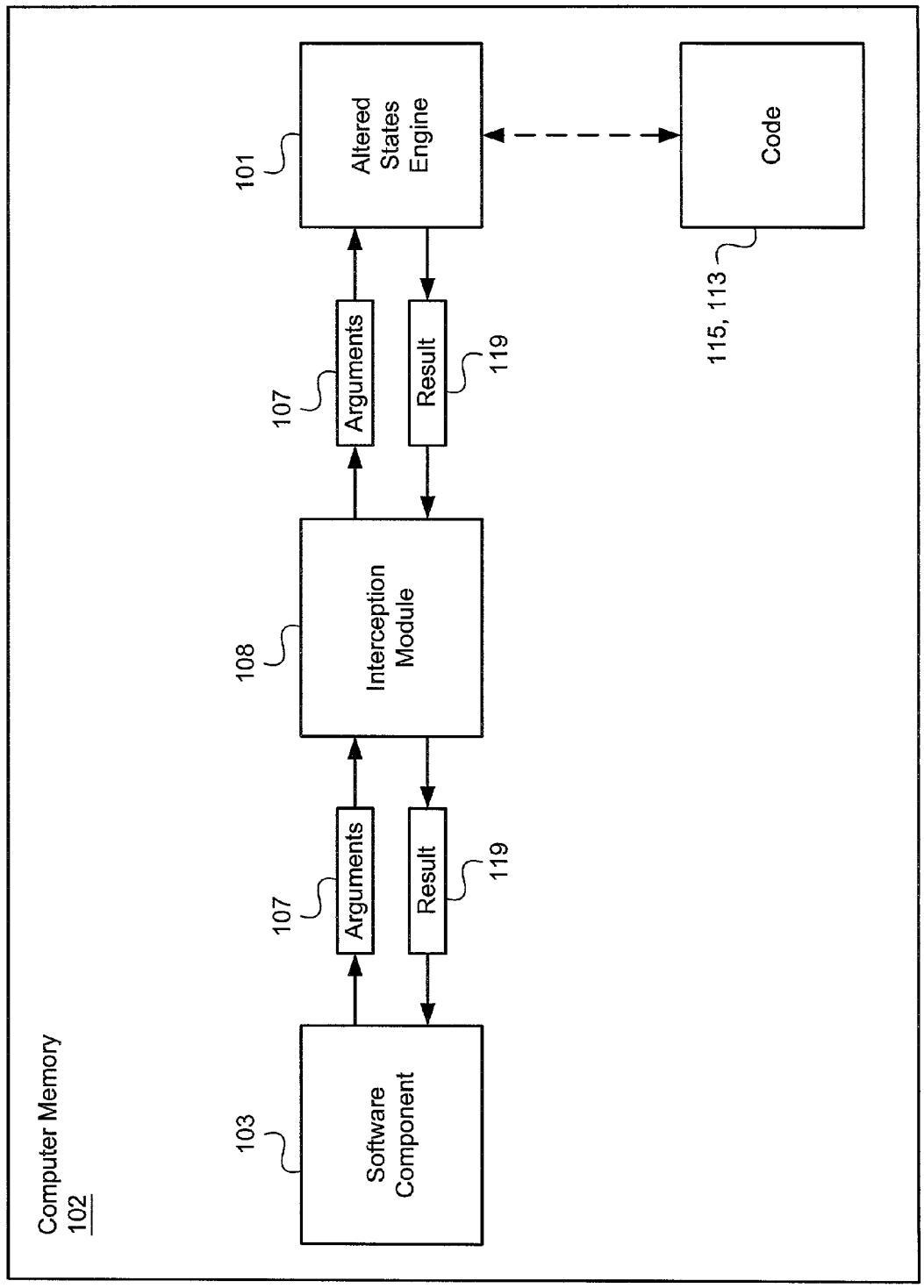
FIG. 2 is a block diagram illustrating the interception module, according to one embodiment of the present invention.

FIG. 2 illustrates the interception module 108 according to one embodiment of the present invention. The interception module 108 may be understood as residing between a software component 103 that calls system services 105, and the actual code that is executed in response to service requests. For selected service requests made by the software component 103, the interception module 108 captures the request, including particulars such as the name (or number) of the system service 105 requested, and all other arguments 107 given in the invocation. The interception module 108 passes these arguments 107 to the altered states engine 101 which, as described below, manages the actual calling of code in response to the service request. After the code has executed, the interception module 108 receives, from the altered states engine 101, the result 119 returned by the system service 105. The interception module 108 passes this result 119 back to the calling software component 103.

Techniques for interception of system services 105 are well known to those of ordinary skill in the relevant art. The actual techniques utilized by the interception module 108 comprise a design choice, which can be based upon the type of system service 105 being intercepted. For example, in the case of hardware or software supported system calls, interception of a call can comprise redirection of an interrupt service vector to alternative code. For library-based services, interception can take the form of the modification of dynamically-linked libraries (prior to loading or at link time, as desired). For any subroutine (function) based service, redirection of the subroutine call instruction, or machine-code patching of subroutine entry code can be employed. Any service dispatch mechanism based on dynamic name-resolution can be intercepted by a change in the service-lookup namespace.

These interception techniques are described, for example, in Deutsch, in Edjlali G., et al., "History-based Access Control for Mobile Code," *Proc. 5th Conference on Computer & Communications Security*, May 1998, in Erlingsson, Ú. and Schneider, F. B., "SASI Enforcement of Security Policies: A Retrospective," *Proceedings* 1999 *New Security Paradigms Workshop*, ACM Press, September 1999, in Erlingsson, Ú. and Schneider, F. B., "IRM Enforcement of Java Stack Inspection," *Proceedings* 2000 *IEEE Symposium on Security and Privacy*, May 2000, in Evans, D. and Twyman, A., "Policy-directed Code Safety," *Proceedings of* 1999 *IEEE Symposium on Security and Privacy*, May 1999, in Goldberg, I., et al., "A Secure Environment for Untrusted Helper Applications: Confining the Wily Hacker," *Proceedings of* 1996 *USENIX Security Symposium*, July 1996, in Pandey, R. and Hashii, B., "Providing Fine-grained Access Control for Mobile Programs through Binary Editing," *Technical Report TR*98 08, University of California, Davis, August 1998, in Badger, L., et al., "Hardening COTS Software with Generic Software Wrappers." *Proceedings of* 1999 *IEEE Symposium on Security and Privacy*, May 1999, pp 2-16, in Wahbe, R., et al., "Efficient Software-based Fault Isolation," *Operating System Review,* 27(5), 1993, and in U.S. Pat. No. 6,023,721 entitled "Method and System for Allowing a Single-user Application Executing in a Multi-user Environment to Create Objects Having both User Global and System Global Visability," issued Feb. 8, 2000. Those skilled in the relevant art are familiar with the techniques described in these publications.

In one embodiment of the invention, all system service 105 requests are intercepted, whereas in some alternative embodiments a subset of the system services 105 are selected for interception. Which system services 105 are intercepted is a design choice, based upon the functionality desired for the software component 103. For example, if it is desired to provide enhanced security, all security-relevant service invocations could be intercepted, such that the interception module 108 cannot be circumvented or subverted by the service client. For client software components 103 comprising arbitrary machine language, security concerns could thus restrict interception technologies to system-call interception, or techniques based on client interpretation. However, for client software components 103 for which guarantees such as type safety are known to hold true, e.g., through their construction or their run-time environment, the fall gamut of interception techniques would still be available, despite the security requirements. The behavior of the software component 103 is thus controlled by intercepting requests for system services 105, and subsequently controlling what functionality is or is not executed in response.

It will be readily understood by those skilled in the relevant art that the interception module 108, as well as the other components of the present invention, can be implemented as software executing in computer memory 102, either as a standalone program (as illustrated in FIG. 2), as part of a larger program, or as a plurality of separate programs, which in turn can be either standalone or combined with other programs as desired. Of course, the interception module 108 (and other invention components) can be instantiated not only as software, but also as hardware, firmware, or any combination of software, hardware and/or firmware as desired.

III. Rule Specifications

Figure 3:
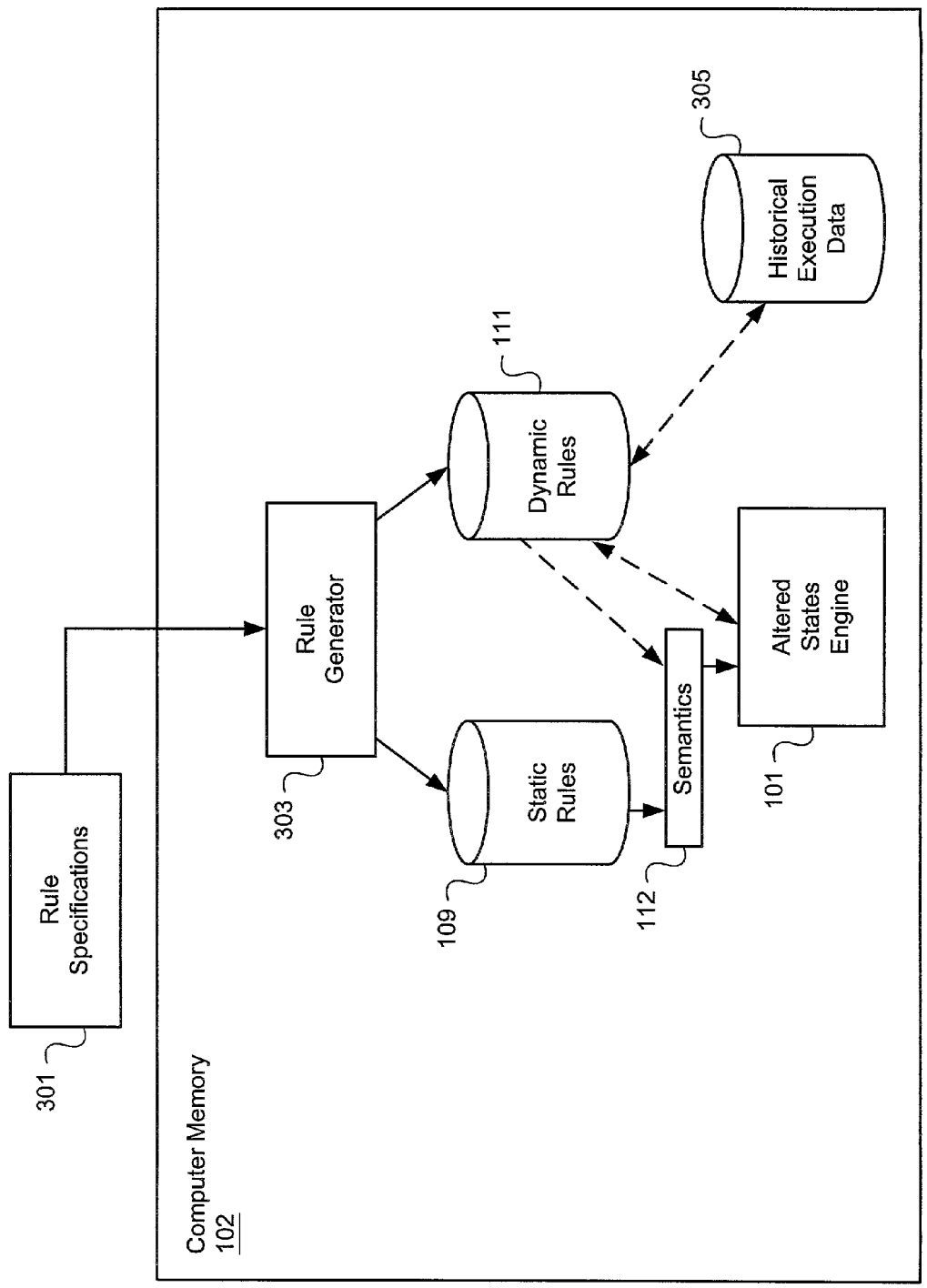
FIG. 3 is a block diagram illustrating utilization of rule specifications, according to one embodiment of the present invention.

FIG. 3 illustrates an example of utilizing rule specifications 301 to alter the behavior of a software component 103 according to one embodiment of the present invention. Rule specifications 301 can be authored by a developer or system administrator to implement a desired change in software component 103 functionality. Software developers can in effect create new software products by changing the behavior of an existing software components 103 through the use of rule specifications 301.

Rule specifications 301 are semantic descriptions of how the behavior of a software component 103 is to be altered under articulated conditions. The contents of rule specifications 301 are a design choice, determined by the desired software component 103 behavior. Rule specifications 301 can dictate that software component 103 behavior be affected in any of the ways and combinations thereof described herein. It will be readily apparent to one of ordinary skill in the relevant art that a limitless number of possibilities exist for altering software component 103 behavior with rule specifications 301.

In one embodiment, the rule specifications 301 themselves take the form of script like directives. In that embodiment, an author of rule specifications 301 uses a text editor or the like to create a human-readable text file containing rule specifications 301 according to desired semantics, in a manner readily apparent to one of skill in the art. In various embodiments, the rule specifications 301 can be authored in semantic formats such as or similar to known scripting languages or high level computer languages, or in a more user friendly natural language like format.

The rule specifications 301 themselves do not need to (but can) be available at run time to the altered states engine 101. This is because in some embodiments of the present invention, rule specifications 301 are compiled or otherwise processed by a rule generator 303 into a machine-readable form, which is in turn directly useable by the altered states engine 101 at run time. In an alternative embodiment, rule specifications 301 are interpreted by a rule generator 303 at run time. Lexicography, parsing, compilation and interpretation of computer languages is well known, and as will be readily apparent to skilled artisans, rule specifications 301 instantiated in any semantic format that can be processed by a computer are within the scope of the present invention.

The rules generated from rule specifications 301 comprise static rules 109. The static rules 109 are consulted by the altered states engine 101 when a system service 105 has been intercepted. The static rules 109 specify desired behavior based on the service 105 that has been intercepted and arguments 107 passed to the service. In other words, static rules articulate desired alternative behavior for the system service 105 actually requested (identified for example by its name or number) and based on the arguments 107 passed to the service 105. This in turn controls the behavior of the software component 103 that called the system service 105.

In one embodiment, the static rules 109 specify specific semantics 112 for the altered states engine 101 to employ to affect the behavior of the software component 103 as desired. These semantics 112 can include specification of (a) whether dynamic rules 111 are to be consulted to further resolve semantics 112, (b) whether to invoke the predefined (original) code 113 for the system service request 105, or alternate code 115 or both, (c) what arguments 107 to pass to the called code and how the arguments 107 are related to the original service request 105 arguments 107 (e.g. the semantics can, for example, direct a substitution of one value for another), (d) how the result returned 119 is to be derived from the arguments 107 or code results 119, and (e) any additional information needed by (a) through (d).

As described above, static rules 109 can specify that dynamic rules 111 be consulted, so that the behavior of an executing software component 103 can be modified according to run time dependent conditions. Dynamic rules 111 are similar to static rules 109, except that they can change at run time. In one embodiment, a system administrator or the like can modify dynamic rules 111 while a software component 103 is running, in order to affect the behavior thereof as desired. Furthermore, the semantics 112 specified by dynamic rules 111 can be dependent upon runtime variables, such as historical execution data 305 (e.g. data summarizing the execution of the software component 103 so far). In some embodiments, the dynamic rules 111 can be updated by the altered states engine 101.

As well as specifying semantics 112 for the altered states engine 101, dynamic rules 111 can also change (or not change, as desired) the historical execution data 305 in any arbitrary way based on received arguments 107. Thus, the behavior of the software component 103 can be affected in complicated ways based on its behavior up to that point.

IV. The Altered States Engine

Figure 4:
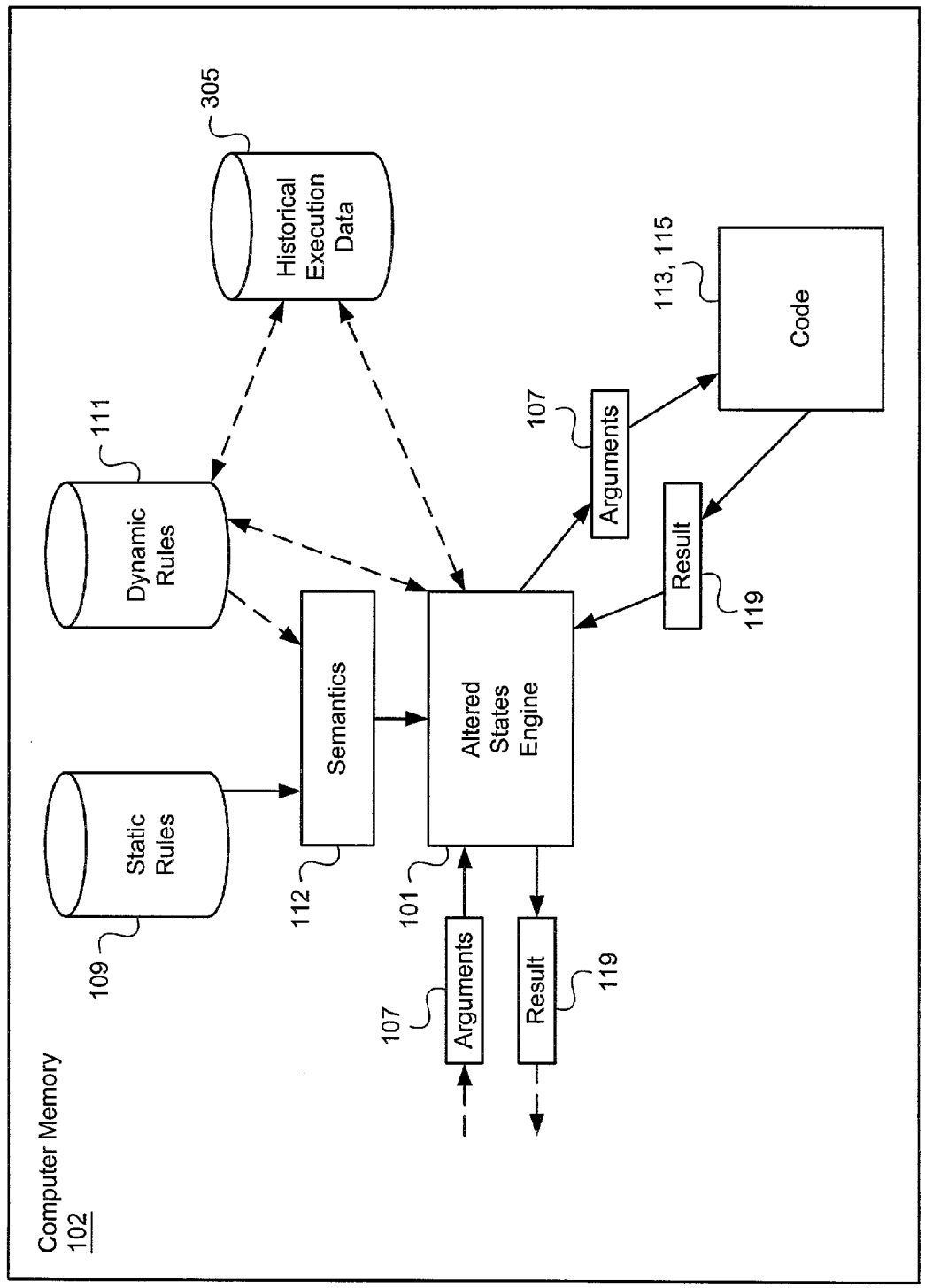
FIG. 4 is a block diagram illustrating the altered states engine, according to one embodiment of the present invention.

FIG. 4 illustrates the Altered States Engine 101 according to one embodiment of the present invention. The altered states engine 101 uses the semantics 112 specified by static rules 109 to determine whether dynamic rules 111 are to be consulted (and thereby, perhaps, historical data 305 modified), and also whether to invoke alternate 115 or predefined 113 system code (or both) and the order and arguments 107 of invocation.

One aspect of controlling the desired alternative behavior of the software component 103 (based on semantics 112 specified by the static 109 and/or dynamic rules 111) is the derivation of arguments 107 by the altered states engine 101 to be passed to the called code (alternative 115 and/or predefined 113). Depending upon the functionality desired, this derivation can involve, for example, modifying the namespace of arguments 107 to point to data other than that pointed to originally (and, perhaps, with different access permissions and other properties).

Another function of the altered states engine 101 is determining the result 119 to return from the service request 105, be it an "access denied" status, or some other combination of return values from rules or code.

V. Execution of Code

Alternative code 115 is added to the system 100 as part of the altered states mechanism in order to complement the already present predefined code 113 for system services 105. The two sets of code can be invoked with the same or different arguments 107 (depending upon the semantics 112 specified by the rules, which in turn depend upon the desired software component 103 behavior). Often (although not necessarily), the alternate code 115 will make use of predefined code 115 in its implementation (e.g., for reading or writing system data 117). That is to say, it will commonly be desirable to extend, limit or otherwise affect the predefined system service request 105. In such cases, the alternative code 115 will generally call the predefined code 113 at some point during its own execution. Of course, nothing precludes alternative code 115 from changing the operation of a system service request 105 altogether, and not calling the predefined code 113 as part of its own operation. Alternative code 115 can also directly modify the historical execution data 305 or dynamic rules 111 (e.g., in cases where this data is analogous to the alternate system data used in virtualization).

VI. Embodiment without Interception

Figure 5:
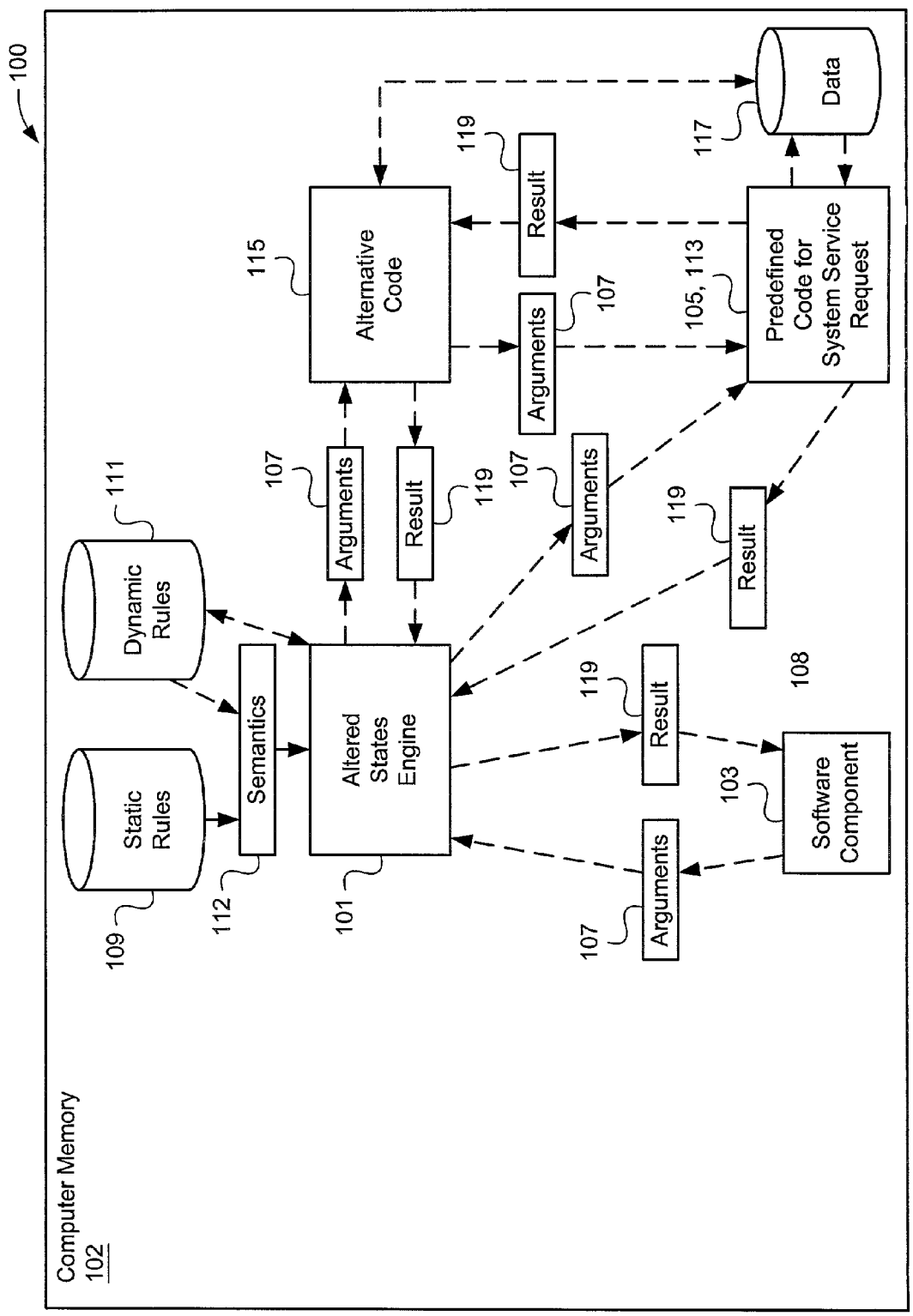
FIG. 5 is a block diagram illustrating an alternative embodiment of the present invention that does not utilize an interception module.

FIG. 5 illustrates an alternative embodiment of the present invention, in which software component 103 behavior is flexibly altered according to condition dependent rules without the explicit interception of system service requests 105. An altered states engine 101 and a software component 103 execute in computer memory 102. Rather than calling system services 105 with appropriate arguments 107 (as described above), the software component 103 calls the altered states engine 101 directly. In this embodiment, rather than intercepting system service 105 calls by an interception module 108, the altered states engine 101 receives requests directly from the software component 103 (e.g., the software component 103 calls the altered states engine 101). As with the various embodiments described above, the altered states engine 101 can consult static rules 109 and/or dynamic rules 111 to determine the desired behavior for the software component 103 under the current conditions, and consequently the desired semantics 112 for the system service 105. In order to execute the desired system service 105 semantics 112, the altered states engine 101 may invoke the predefined code 113 for the called system service 105 (with either modified, alternative or unchanged arguments 107, as desired), or may invoke alternative code 115 to perform similar or non-similar functionality (e.g. code with the same or an entirely different purpose). The alternative code 115 can but need not call predefined code 113. The code that executes (be it predefined code 113, alternative code 115 or a combination of the two) can access original system data 117, a copy thereof, or alternative data 117 as desired. Upon completion of execution, the code returns a result 119 to the altered states engine 101, which in turn returns the result 119 to the calling software component 103. It will be readily apparent to one of skill in the art that the embodiments described above, which utilize an interception module 108, have possible alternative implementations, in which the altered states engine receives requests directly from the software component 103, as illustrated by FIG. 5. These alternative embodiments are within the scope of the present invention.

VII. Examples of Utilization of Altered States Technology

An altered states system 100 can intercept and mediate on arbitrary interfaces in a computer system, and is not limited to any single abstraction level, such as the system call interface. In this manner, an altered states system 100 can mediate on interfaces from the highest to the lowest level. For example, an altered states system 100 can intercept and alter the behavior of scripting services, application events, application programming interfaces (APIs), common library calls, system calls, operating system kernel abstractions, device interfaces and callbacks, and even hardware interrupts (such as timers), all within a single software component 103.

For example, an altered states system 100 can intercept the opening of a mail message in a mail-enabled software component 103 (a high-level application interface). Based on a dynamic rule 111, the altered states system 100 could change the operating environment of software components 103 launched to handle the message attachments (by, for example, changing the behavior of system calls for launching processes). This could be used, for example, to change the device-level interfaces and thereby limit or expand network availability within that environment for various software components 103 as desired.

An alternate example would be the modification of Uniform Resource Locator (URL) handling of software components 103 (e.g., through an altered states system 100 use of a BrowserHelperObject in Microsoft Windows®) in order to modify the environment used for handling the URL content, based on some URL attribute.

Another example would be an altered states system 100 interception of graphical APIs in order to denote the type of operating environment of a software components 103 displaying information to users in order to signal to users what behavior to expect.

Because of its flexible ability to control and dynamically modify access to computer resources, an altered states system 100 is of course useful for computer security purposes. However, an altered states system 100 is also useful in many other areas, as demonstrated by the last example above. Therefore, an altered states system 100 mediation need not be incorruptible in all embodiments. In some embodiments, depending upon the particulars of mediation intent, an altered states system 100 need not prevent every possibility of malicious circumvention and subversion in order to remain useful.

Nonetheless, when combined with secure mediation interfaces (such as system call interception) an altered states system 100 can provide be extremely flexible, in that an altered states system 100 can leverage built-in authentication methods, and complement them with arbitrary changes in semantics and the flexibility of dynamic rules 111 created from observation of execution history. The types of security provided by an altered states system 100 mechanism not only encompasses privilege attenuation (i.e., limiting access) but also privilege amplification and access redirection (i.e., original access is neither allowed or denied).

One form of access redirection is virtualization, which typically has partitioning "same code, separate data" semantics—i.e., it enhances the usability of a computer service (or operation, implemented in either software or hardware) by allowing its simultaneous use on multiple disjointed data items. An altered states system 100 can implement virtualization, but can also extend it by allowing services to operate simultaneously on virtualized as well as actual data, in a combination specified with altered states system 100 static 109 and/or dynamic 111 rules. Thus the same operation may operate on different data at different times, according to rule-specified criteria, e.g., a history-based dynamic rule 111 virtualizing all web-browser operations after untrusted websites have been browsed.

Altered states system 100 virtualization can be combined with access control, such that virtualized services have different privileges (e.g., more) to virtualized data and to accessible actual data (e.g., less), than the service would typically have. One benefit of an altered states system 100 above traditional virtualization is the ability of an altered states system 100 to redirect access to fake data (which may, or may not, be virtualized). Non-exhaustive examples include changing the user name returned to a software component 103 viewing untrusted documents in order to protect the user's privacy, and modifying the execution environment (such as the registry in Microsoft Windows®) of a software component 103 to affect its behavior.

In an altered states system 100, virtualization, as well as other access, can be based on and dynamically linked to an existing environment containing actual data. Thus, the initial state of the virtual environment can be taken from a snapshot of an existing system state (or a subset of that state). An example would be creating an application environment identical to that of a specific user, but virtualized so modifications have no effect on the user's original environment. Also, the system state may be dynamically linked, such that, for example, the actual state's value is always 90% of the virtualized value, or the other way around.

Finally, an altered states system 100 imposes no restriction on the structure of code and rules used (e.g., they need not be independent components), thus allowing maximum flexibility, and the potential for running an altered states system 100 on a distributed system.

VIII. Conclusion

An altered states system 100 provides many benefits, many deriving from the increased flexibility provided by a rule-based approach to changing the environment in which software components 103 execute. Software components 103 running in conjunction with an altered states system 100 can be more useful and provide more functionality than originally intended. For example, an altered states system 100 can help software components 103 designed to run on a standalone computer to run over a network, through use of rules forwarding certain service invocations to networked services. Also, by use of the right static 109 and dynamic rules 111, an altered states system 100 can enable the full functionality of a software component 103 otherwise limited due to shortcomings or incompatibilities such as lack of necessary privileges. For example, all service requests from a media player displaying content from an untrusted source can be ignored or redirected, except for audio and video services.

As will be understood by those familiar with the art, the invention may be embodied in other specific forms without departing from the spirit or essential characteristics thereof. Likewise, the particular naming and division of the modules, features, attributes, methodologies and other aspects are not mandatory or significant, and the mechanisms that implement the invention or its features may have different names, divisions and/or formats. Furthermore, as will be apparent to one of ordinary skill in the relevant art, the modules, features, attributes, methodologies and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, although Microsoft Windows® is in several places used as an example within this specification, the present invention is in no way limited to any specific operating system or environment. Although the present invention can be implemented in a computer system running Microsoft Windows®, the present invention can also be implemented under other operating systems, for example Solaris® or Linux. Accordingly, the disclosure of the present invention is intended to be illustrative, but not limiting, of the scope of the invention, which is set forth in the following claims.

What is claimed is:

1. A method in a computer system for flexibly altering software component behavior, the method comprising:
intercepting a service request made by a software component;
evaluating the intercepted service request based on at least one dynamically alterable condition dependent rule, an original or modified data in the service request, and at least one of a present software system state and a past software system state, wherein the at least one dynamically alterable condition dependent rule is alterable while the requesting software component is running;
dynamically selecting at least one desired behavior from among several behaviors for the software component based on the evaluation;
dynamically controlling the software component such that the software component executes the selected desired behavior, wherein the selected desired behavior includes executing alternative code using a copy of requested data in order to virtualize execution of the intercepted service request on the requested data;
altering operation of the intercepted service request based on a result of the virtualized execution of the intercepted service request; and
executing alternative code to directly modify the at least one dynamically alterable condition dependent rule while the requesting software component is running.

2. The method of claim 1 wherein:
intercepting a service request comprises intercepting a software supported system call.

3. The method of claim 2 wherein:
intercepting a software supported system call further comprises redirecting an entry in an interrupt vector table to alternative code.

4. The method of claim 1 wherein:
intercepting a service request comprises intercepting a hardware supported system call.

5. The method of claim 4 wherein:
intercepting a hardware supported system call further comprises redirecting an entry in an interrupt vector table to alternative code.

6. The method of claim 1 wherein:
intercepting a service request comprises intercepting a software library based subroutine call.

7. The method of claim 6 wherein:
intercepting a software library based subroutine call further comprises modifying at least one dynamically linked library.

8. The method of claim 1 wherein:
intercepting a service request comprises intercepting a subroutine based service.

9. The method of claim 8 wherein:
intercepting a subroutine based service further comprises redirecting a subroutine call instruction to alternative code.

10. The method of claim 8 wherein:
intercepting a subroutine based service further comprises patching machine language entry code of the subroutine.

11. The method of claim 1 wherein:
intercepting a service request comprises intercepting a service dispatch mechanism based on dynamic name resolution.

12. The method of claim 11 wherein:
intercepting a service dispatch mechanism based on dynamic name resolution further comprises modifying service lookup name space.

13. The method of claim 1 further wherein the selected desired behavior for the software component further comprises:
executing alternative code in response to intercepting the service request.

14. The method of claim 13 further comprising:
executing alternative code in addition to calling the service request.

15. The method of claim 13 wherein:
the alternative code performs an operation with a same purpose as that of the service request.

16. The method of claim 13 wherein:
the alternative code performs an operation with a different purpose from that of the service request.

17. The method of claim 1 further wherein the selected desired behavior for the software component further comprises:
preventing execution of the service request.

18. The method of claim 17 further comprising:
returning a value to the software component so as to simulate execution of the service request, without actually calling the service request.

19. The method of claim 1 further wherein the selected desired behavior for the software component further comprises:
preventing code that executes in response to interception of the service request from accessing at least some data.

20. The method of claim 19 further comprising:
allowing code that executes in response to interception of the service request to access alternative data, different from requested data.

21. The method of claim 20 wherein:
the alternative data comprises a copy of at least some requested data.

22. The method of claim 19 wherein:
code that executes in response to the interception of the service request comprises at least alternative code.

23. The method of claim 19 wherein:
code that executes in response to the interception of the service request comprises at least the service request.

24. The method of claim 1 wherein dynamically controlling the software component further comprises:
passing alternative parameters to code that executes in response to interception of the service request.

25. The method of claim 24 further comprising:
creating the alternative parameters by modifying original parameters passed to the service request.

26. The method of claim 1 wherein dynamically controlling the software component further comprises:
executing alternative code in response to interception of the service request.

27. The method of claim 1 wherein dynamically controlling the software component further comprises:
executing alternative code in response to interception of the service request; and executing the service request.

28. The method of claim 1 wherein dynamically controlling the software component further comprises:
preventing execution of the service request.

29. The method of claim 1 wherein dynamically controlling the software component further comprises:
simulating execution of the service request by returning a value to the software component.

30. The method of claim 1 wherein dynamically controlling the software component further comprises:
preventing code that executes in response to interception of the service request from accessing at least some data.

31. The method of claim 30 further comprising:
allowing code that executes in response to interception of the service request to access alternative data, different from requested data.

32. The method of claim 31 wherein:
the alternative data comprises a copy of at least some data.

33. The method of claim 1 wherein dynamically controlling the software component further comprises:
returning an alternative value to the software component.

34. The method of claim 33 further comprising:
creating the alternative value by modifying a value returned by the service request.

35. The method of claim 1 further wherein the selected desired behavior for the software component further comprises:
preventing code that executes in response to interception of the service request from accessing a system resource.

36. The method of claim 35 wherein:
the system resource comprises a network.

37. The method of claim 35 wherein:
the system resource comprises storage media.

38. The method of claim 35 wherein:
the system resource comprises a file system.

39. The method of claim 35 wherein:
the system resource comprises a specific file.

40. The method of claim 35 wherein:
the system resource comprises configuration information.

41. The method of claim 40 wherein:
the configuration information comprises registry data.

42. The method of claim 1 further comprising:
modifying the at least one dynamically alterable condition dependent rule in response to behavior of the software component.

43. The method of claim 42 wherein modifying the at least one dynamically alterable condition dependent rule in response to the behavior of the software component further comprises:
responding to an attempt by the software component to access specific data, by consulting a rule that specifies that the software component cannot access other data.

44. The method of claim 42 wherein modifying the at least one dynamically alterable condition dependent rule in response to the behavior of the software component further comprises:
responding to an attempt by the software component to access specific data, by consulting a rule that specifies that the software component cannot perform certain functionality.

45. The method of claim 1 wherein the at least one dynamically alterable condition dependent rule specifies the desired behavior for the software component and is based on at least one of the following criteria:
a user with which the software component is associated;
identity of the software component;
a time at which the software component is executing;
history of the software component;
a source of the software component;
data which the software component attempts to access;
functionality that software component attempts to execute; and computer network resources that the software component attempts to access.

46. A computer system for flexibly altering software component behavior, the system comprising:

an interception module, for intercepting a service request made by a software component and altering operation of the intercepted service request based on a result of a virtualized execution of the intercepted service request;

an altered states engine coupled to the interception module, for evaluating the intercepted service request based on at least one dynamically alterable condition dependent rule, an original or modified data in the service request, and at least one of a present software system state and a past software system state, wherein the at least one dynamically alterable condition dependent rule is alterable while the requesting software component is running; and for dynamically selecting at least one desired behavior from among several behaviors for the software component based on the evaluation, wherein the selected desired behavior includes executing alternative code using a copy of requested data in order to virtualize execution of the intercepted service request on the requested data;

at least one rules database, for storing at least one dynamically alterable condition dependent rule, the rules database being coupled to the altered states engine;

alternative code for executing in response to an intercepted service request made by the software component, wherein the alternative code is used for dynamically controlling the software component such that the software component executes the selected desired behavior, the alternative code being coupled to the altered states engine; and alternative code for directly modifying the at least one dynamically alterable condition dependent rule while the requesting software component is running, the alternative code for directly modifying being coupled to the altered states engine.

47. A computer system for flexibly altering software component behavior, the system including a processor and memory, comprising:

a software portion for intercepting a service request made by a software component;

a software portion for evaluating the intercepted service request based on at least one dynamically alterable condition dependent rule, an original or modified data in the service request, and at least one of a present software system state and a past software system state, wherein the at least one dynamically alterable condition dependent rule is alterable while the requesting software component is running;

a software portion for dynamically selecting at least one desired behavior from among several behaviors for the software component based on the evaluation;

a software portion for dynamically controlling the software component such that the software component executes the selected desired behavior, wherein the selected described behavior includes executing alternative code using a copy of requested data in order to virtualize execution of the intercepted service request on the requested data;

a software portion for altering operation of the intercepted service request based on a result of the virtualized execution of the intercepted service request; and a software portion for executing alternative code to directly modify the at least one dynamically alterable condition dependent rule while the requesting software component is running, wherein each software portion can be stored in the memory and executed by the processor.

48. A computer readable medium containing instructions for controlling a processor to perform steps in a method for flexibly altering software component behavior, the steps comprising:
- intercepting a service request made by a software component;
- evaluating the intercepted service request based on at least one dynamically alterable condition dependent rule, an original or modified data in the service request, and at least one of a present software system state and a past software system, wherein the at least one dynamically alterable condition dependent rule is alterable while the requesting software component is running;
- dynamically selecting at least one desired behavior from among several behaviors for the software component based on the evaluation;
- dynamically controlling the software component such that the software component executes the selected desired behavior, wherein the selected desired behavior includes executing alternative code using a copy of requested data in order to virtualize execution of the intercepted service request on the requested data;
- altering operation of the intercepted service request based on a result of the virtualized execution of the intercepted service request; and
- executing alternative code to directly modify the at least one dynamically alterable condition dependent rule while the requesting software component is running.

49. The computer readable medium of claim 48 wherein intercepting the service request further comprises:
- executing alternative code in response to interception of the service request.

50. The computer readable medium of claim 48 wherein intercepting the service request further comprises:
- preventing code that executes in response to interception of the service request from accessing at least some data.

51. The computer readable medium of claim 50 further controlling a processor to perform a step comprising:
- allowing code that executes in response to interception of the service request to access alternative data, different from requested data.

52. The computer readable medium of claim 48 wherein intercepting the service request further comprises:
- passing alternative parameters to code that executes in response to interception of the service request.

53. The computer readable medium of claim 52 further controlling a processor to perform a step comprising:
- creating the alternative parameters by modifying original parameters passed to the service request.

54. The computer readable medium of claim 48 wherein intercepting the service request further comprises:
- executing alternative code in response to interception of the service request.

55. The computer readable medium of claim 54 further controlling a processor to perform a step comprising:
- executing alternative code in response to interception of the service request; and executing the service request.

56. The computer readable medium of claim 48 wherein intercepting the service request further comprises:
- preventing execution of the service request.

57. The computer readable medium of claim 48 wherein intercepting the service request further comprises:
- simulating execution of the service request by returning a value to the software component.

58. The computer readable medium of claim 48 wherein intercepting the service request further comprises:
- returning an alternative value to the software component.

59. A computer-implemented method in a computer system for flexibly altering software component behavior, the computer-implemented method comprising:
- receiving, by an altered states engine, a service request made by a software component;
- evaluating the received service request based on at least one dynamically alterable condition dependent rule, an original or modified data in the service request, and at least one of a present software system state and a past software system state, wherein the at least one dynamically alterable condition dependent rule is alterable while the requesting software component is running;
- dynamically selecting at least one desired behavior from among several behaviors for the software component based on the evaluation;
- dynamically controlling the software component such that the software component executes the selected desired behavior, wherein the selected desired behavior includes executing alternative code using a copy of requested data in order to virtualize execution of the received service request on the requested data;
- altering operation of the received service request based on a result of the virtualized execution of the received service request; and
- executing alternative code to directly modify the at least one dynamically alterable condition dependent rule while the requesting software component is running.

60. The method of claim 59 further wherein the selected desired behavior for the software component further comprises:
- executing alternative code in response to receiving the service request.

61. The method of claim 60 further comprising:
- executing alternative code in addition to calling the service request.

62. The method of claim 60 wherein:
- the alternative code executed in response to receiving the service request performs an operation with a same purpose as that of the service request.

63. The method of claim 60 wherein:
- the alternative code executed in response to receiving the service request performs an operation with a different purpose from that of the service request.

64. The method of claim 59 further wherein the selected desired behavior for the software component further comprises:
- preventing execution of the service request.

65. The method of claim 64 further comprising:
- returning a value to the software component so as to simulate execution of the service request, without actually calling the service request.

66. The method of claim 59 further wherein the selected desired behavior for the software component further comprises:
- preventing code that executes in response to receipt of the service request from accessing at least some data.

67. The method of claim 66 further comprising:
- allowing code that executes in response to receipt of the service request to access alternative data, different from requested data.

68. The method of claim 67 wherein:
- the alternative data comprises a copy of at least some requested data.

69. The method of claim 66 wherein:
- code that executes in response to the receipt of the service request comprises at least alternative code.

70. The method of claim 66 wherein:
code that executes in response to the receipt of the service request comprises at least the service request.

71. The method of claim 59 wherein dynamically controlling the software component further comprises:
passing alternative parameters to code that executes in response to receipt of the service request.

72. The method of claim 71 further comprising:
creating the alternative parameters by modifying original parameters passed to the service request.

73. The method of claim 59 wherein dynamically controlling the software component further comprises:
executing alternative code in response to receipt of the service request.

74. The method of claim 59 wherein dynamically controlling the software component further comprises:
executing alternative code in response to receipt of the service request; and executing the service request.

75. The method of claim 59 wherein dynamically controlling the software component further comprises:
preventing execution of the service request.

76. The method of claim 59 wherein dynamically controlling the software component further comprises:
simulating execution of the service request by returning a value to the software component.

77. The method of claim 59 wherein dynamically controlling the software component further comprises:
preventing code that executes in response to receipt of the service request from accessing at least some data.

78. The method of claim 77 further comprising:
allowing code that executes in response to receipt of the service request to access alternative data, different from requested data.

79. The method of claim 78 wherein:
the alternative data comprises a copy of at least some data.

80. The method of claim 59 wherein dynamically controlling the software component further comprises: returning an alternative value to the software component.

81. The method of claim 80 further comprising:
creating the alternative value by modifying a value returned by the service request.

82. The method of claim 59 further wherein the selected desired behavior for the software component further comprises:
preventing code that executes in response to receipt of the service request from accessing a system resource.

83. The method of claim 82 wherein:
the system resource comprises a network.

84. The method of claim 82 wherein:
the system resource comprises storage media.

85. The method of claim 82 wherein:
the system resource comprises a file system.

86. The method of claim 82 wherein:
the system resource comprises a specific file.

87. The method of claim 82 wherein:
the system resource comprises configuration information.

88. The method of claim 87 wherein:
the configuration information comprises registry data.

89. The method of claim 59 further comprising:
modifying the at least one dynamically alterable condition dependent rule in response to behavior of the software component.

90. The method of claim 89 wherein modifying the at least one dynamically alterable condition dependent rule in response to the behavior of the software component further comprises:
responding to an attempt by the software component to access specific data by consulting a rule that specifies that the software component cannot access other data.

91. The method of claim 89 wherein modifying the at least one dynamically alterable condition dependent rule in response to the behavior of the software component further comprises:
responding to an attempt by the software component to access specific data by consulting a rule that specifies that the software component cannot perform certain functionality.

92. The method of claim 59 wherein the at least one dynamically alterable condition dependent rule specifies the desired behavior for the software component and is based on at least one of the following criteria:
a user with which the software component is associated;
identity of the software component;
a time at which the software component is executing;
history of the software component;
a source of the software component;
data which the software component attempts to access;
functionality that software component attempts to execute; and computer network resources that the software component attempts to access.

93. A computer system for flexibly altering software component behavior, the computer system comprising:
a receiving module, for receiving a service request made by a software component;
an altered states engine coupled to the receiving module and controlled by a processor, for:
evaluating the received service request based on at least one dynamically alterable condition dependent rule, an original or modified data in the service request, and at least one of a present software system state and a past software system state, wherein the at least one dynamically alterable condition dependent rule is alterable while the requesting software component is running; and
dynamically selecting a desired behavior from among several behaviors for the software component based on the evaluation;
a returning module, for altering operation of the received service request based on a result of a virtualized execution of the received service request;
at least one rules database, for storing at least one dynamically alterable condition dependent rule, the rules database being coupled to the altered states engine;
alternative code for executing in response to a received service request made by the software component, wherein the alternative code is used for dynamically controlling the software component such that the software component executes the selected desired behavior, wherein the selected desired behavior includes executing alternative code using a copy of requested data in order to virtualize execution of the received service request on the requested data the alternative code for executing in response to a received service request being coupled to the altered states engine; and
alternative code for directly modifying the at least one dynamically alterable condition dependent rule while the requesting software component is running, the alternative code for directly modifying being coupled to the altered states engine.

94. A computer system for flexibly altering software component behavior, the system including a processor and memory, comprising:

a software portion controlled by the processor for receiving a service request made by a software component;

a software portion controlled by the processor for evaluating the received service request based on at least one dynamically alterable condition dependent rule, an original or modified data in the service request, and at least one of a present software system state and a past software system state, wherein the at least one dynamically alterable condition dependent rule is alterable while the requesting software component is running;

a software portion controlled by the processor for dynamically selecting a desired behavior from among several behaviors for the software component based on the evaluation;

a software portion controlled by the processor for dynamically controlling the software component such that the software component executes the selected desired behavior, wherein the selected desired behavior includes executing alternative code using a copy of requested data in order to virtualize execution of the received service request on the requested data;

a software portion controlled by the processor for altering operation of the received service request based on a result of the virtualized execution of the received service request; and a software portion controlled by the processor for executing alternative code to directly modify the at least one dynamically alterable condition dependent rule while the requesting software component is running, wherein each software portion can be stored in the memory and executed by the processor.

95. A computer readable medium containing instructions for controlling a processor to perform steps in a method for flexibly altering software component behavior, the steps comprising:

receiving a service request made by a software component;

evaluating the received service request based on at least one dynamically alterable condition dependent rule, an original or modified data in the service request, and at least one of a present software system state and a past software system state, wherein the at least one dynamically alterable condition dependent rule is alterable while the requesting software component is running;

dynamically selecting a desired behavior from among several behaviors for the software component based on the evaluation;

dynamically controlling the software component such that the software component executes the selected desired behavior; wherein the selected desired behavior includes executing alternative code using a copy of requested data in order to virtualize execution of the received service request on the requested data;

altering operation of the received service request based on a result of the virtualized execution of the received service request; and executing alternative code to directly modify the at least one dynamically alterable condition dependent rule while the requesting software component is running.

96. The computer readable medium containing instructions for controlling a processor of claim 95 wherein receiving a service request made by the software component further comprises:

executing alternative code in response to receiving the service request.

97. The computer readable medium containing instructions for controlling a processor of claim 95 wherein receiving a service request made by the software component further comprises:

preventing code that executes in response to receipt of the service request from accessing at least some data.

98. The computer readable medium containing instructions for controlling a processor of claim 97 further controlling a processor to perform a step comprising:

allowing code that executes in response to receipt of the service request to access alternative data, different from requested data.

99. The computer readable medium containing instructions for controlling a processor of claim 95 wherein receiving a service request made by the software component further comprises:

passing alternative parameters to code that executes in response to receipt of the service request.

100. The computer readable medium containing instructions for controlling a processor of claim 99 further controlling a processor to perform a step comprising:

creating the alternative parameters by modifying original parameters passed to the service request.

101. The computer readable medium containing instructions for controlling a processor of claim 95 wherein receiving a service request made by the software component further comprises:

executing alternative code in response to receipt of the service request.

102. The computer readable medium containing instructions for controlling a processor of claim 101 further controlling a processor to perform a step comprising:

executing alternative code in response to receipt of the service request; and executing the service request.

103. The computer readable medium containing instructions for controlling a processor of claim 95 wherein receiving a service request made by the software component further comprises:

preventing execution of the service request.

104. The computer readable medium containing instructions for controlling a processor of claim 95 wherein receiving a service request made by the software component further comprises:

simulating execution of the service request by returning a value to the software component.

105. The computer readable medium containing instructions for controlling a processor of claim 95 wherein receiving a service request made by the software component further comprises:

returning an alternative value to the software component.

106. A method in a computer system for flexibly altering software component behavior, the method comprising:

intercepting a service request made by a software component;

evaluating the intercepted service request based on at least one dynamically alterable condition dependent rule, data in the service request, and a software system state, wherein the at least one dynamically alterable condition dependent rule is alterable while the requesting software component is running;

dynamically selecting at least one desired behavior from among several behaviors for the software component based on the evaluation;

dynamically controlling the software component such that the software component executes the selected desired behavior, wherein the selected desired behavior includes executing alternative code using a copy of requested data in order to virtualize execution of the intercepted service request on the requested data;

altering operation of the intercepted service request based on a result of the virtualized execution of the intercepted service request; and executing alternative code to directly modify the at least one dynamically alterable condition dependent rule while the requesting software component is running.

107. The method of claim 106, wherein the at least one dynamically alterable condition dependent rule is modified based on a result of the virtualized execution.

108. The method of claim 106, further comprising:

executing alternative code to directly modify historical execution data while the requesting software component is running.

109. The method of claim 106, wherein the evaluating the intercepted service request includes evaluating the intercepted service request based on a present software system state and a past software system state.

* * * * *